(Model.)

H. L. HEATON.
Rope Coupling.

No. 237,272. Patented Feb. 1, 1881.

Witnesses
A. H. Krause.
F. G. Dieterich.

Inventor
Horace L. Heaton
by A. Peterson & Co.
— Attorneys —

N. PETERS, PHOTO-LITHOGRAPHER, WASHINGTON, D. C.

UNITED STATES PATENT OFFICE.

HORACE L. HEATON, OF COLUMBUS, OHIO.

ROPE-COUPLING.

SPECIFICATION forming part of Letters Patent No. 237,272, dated February 1, 1881.

Application filed October 29, 1880. (Model.)

*To all whom it may concern:*

Be it known that I, HORACE L. HEATON, of Columbus, in the county of Franklin and State of Ohio, have invented certain new and useful Improvements in Rope-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1:
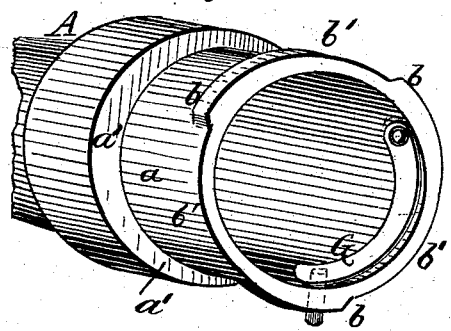
Figure 2:
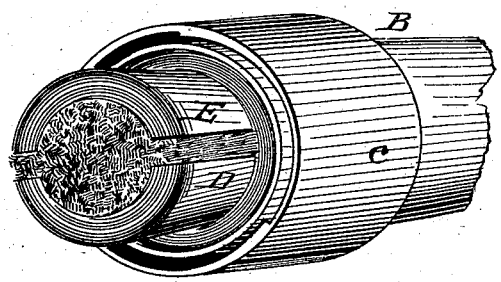
Figure 4:
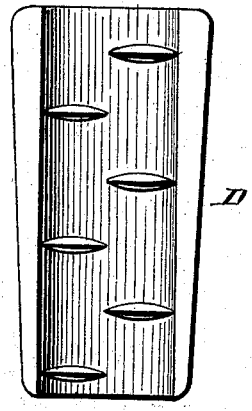
Figure 5:
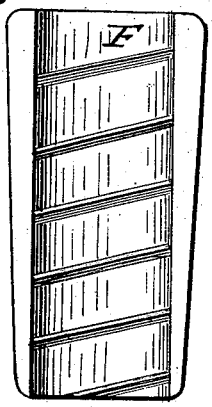
Figure 3:
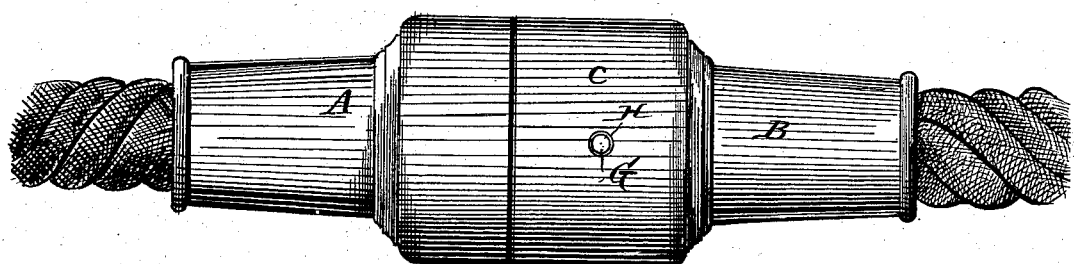

Figure 1 is a perspective view of one end of my improved rope-coupling, showing the connecting lock and catch. Fig. 2 is a similar view of the opposite end with the inclosed rope and its clamps extended out over the thimble. Fig. 3 is a side view of the complete coupling connected and in working order; and Figs. 4 and 5 are inside views of the clamps or clamping-plates, one being a modification of the other.

Similar letters of reference indicate corresponding parts in all the figures.

This invention contemplates improvements in rope-couplings or devices for connecting together, in a safe, simple, and efficient manner, any number of lengths of rope; and it consists in the detailed construction and combination of parts of a device of that class, as hereinafter set forth, and particularly pointed out in the claim.

In the drawings, A B are the thimbles, each of which may be made in one or more parts or pieces with internal tapering surfaces adapted to fit the tapering wedge-plates D E F. The thimble A has a short tubular extension, $a$, around the base of which is an annular shoulder, $a'$, while upon the outer surface of its circumference are a number of cam-shaped projections or plates, $b\,b$, with separating slots or openings $b'\,b'$. Applied to the tubular extension $a$ is also a lock or spring-stud, G. The opposite thimble, B, has a tubular sleeve or enlargement, $c$, with its interior circumference provided with a similar arrangement of cam-shaped studs, which will register with the slots $b'$, separating the studs $b$ of thimble A. It is also provided with a hole or aperture, H, registering with the spring-stud G when the tubular extension $a$ of thimble A is inserted into the sleeve $c$ of its connecting-thimble B. This construction and arrangement of the thimbles A B permits of their being connected and coupled in an easy and expeditious manner by interlocking their respective cams, which will bring the spring-stud G in such a position as to cause it to project into the aperture H, and thus prevent the thimbles from becoming accidentally uncoupled.

The rope ends are held in place within their respective coupling-thimbles A B by wedge-plates, the construction and arrangement of which will readily be understood by reference to Figs. 2, 4, and 5 of the drawings. Each of these clamps or wedge-plates is concavo-convex in cross-section, with their concavities facing the rope provided with a series of serrations, teeth, or studs, as illustrated in Figs. 4 and 5, the said plates being made tapering in longitudinal section, so as to conform to the inner taper of their respective thimbles, into which they are inserted. The clamps or wedges thus being applied to and the rope passed through the thimble, the rope will be held firmly between the clamping-plates, the serrations or teeth of which will bite into it and hold it with a tenacity proportionate to the strain to which it is subjected.

Having thus described my invention, I claim and desire to secure by Letters Patent of the United States—

The described rope-coupling device, composed of the wedge-shaped serrated clamping-plates D E, tapering thimble A, having shoulder $a'$ and cylindrical sleeve $a$, provided with the cams $b$ and spring-stud G, and tapering thimble B, having cylindrical sleeve $c$, provided with inside cams to register and interlock with the cams $b$ of sleeve $a$, and having an aperture, H, to receive and interlock with the spring-stud G, substantially as and for the purpose herein shown and specified.

In testimony that I claim the foregoing as my own I have hereto affixed my signature in presence of two witnesses.

HORACE L. HEATON.

Witnesses:
J. M. LOREN,
D. T. MCNAGHTEN.